UNITED STATES PATENT OFFICE.

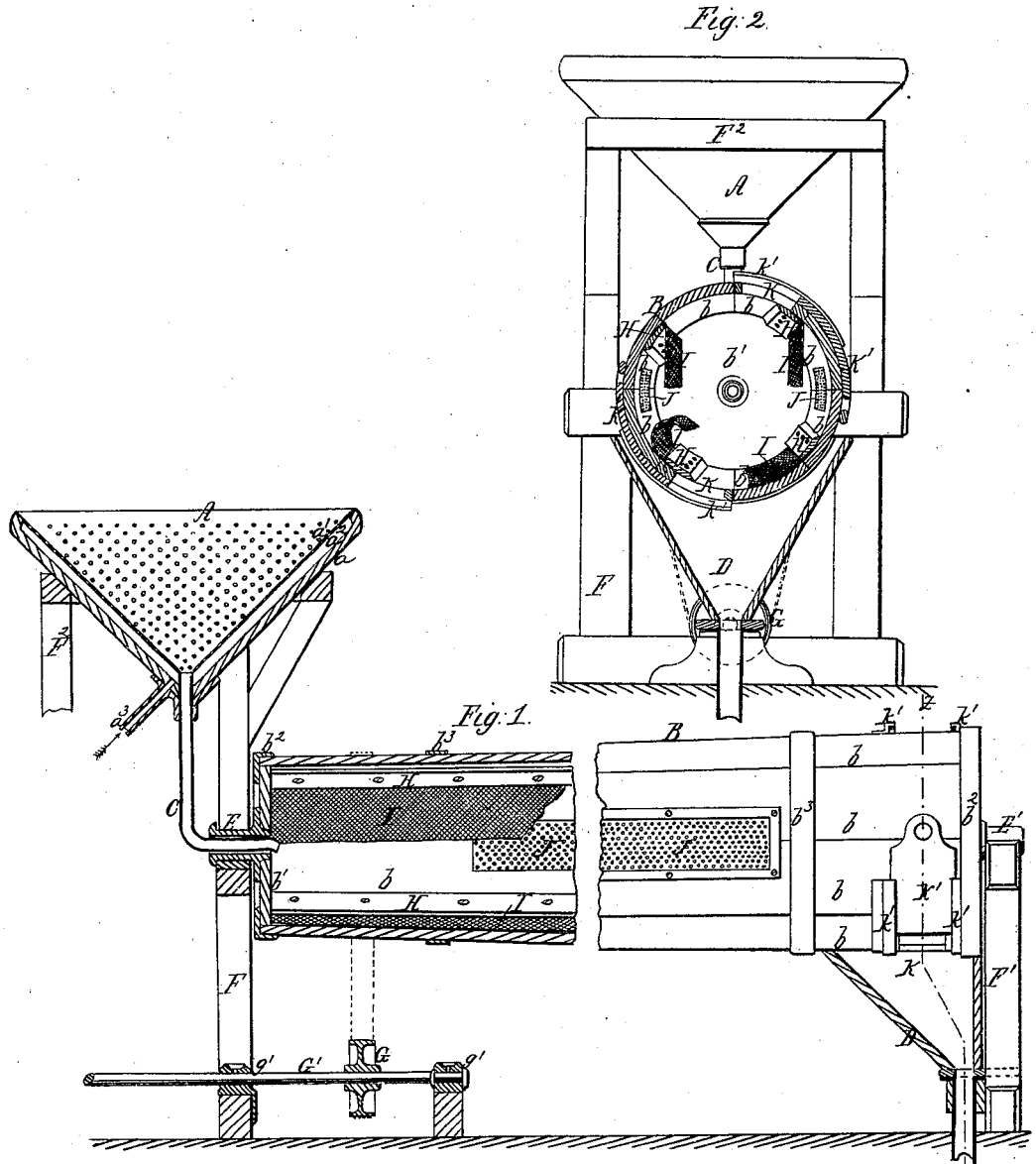

WILLIAM BLAKEY, OF BALTIMORE, MARYLAND.

GRAIN-DRIER.

Specification forming part of Letters Patent No. 95,556, dated October 5, 1869.

*To all whom it may concern:*

Be it known that I, WILLIAM BLAKEY, of Baltimore, in the State of Maryland, have invented a new and useful Apparatus for Deodorizing, Drying, and Polishing Grain, &c., of which the following is a description.

The subject of my invention is a simple and cheap apparatus adapted to perform the operations of deodorizing or freeing from must, &c., drying, cleaning, and polishing rapidly and in a most superior manner, being perfectly self feeding and discharging, and free from liability to injure the coffee or grain in any manner.

The apparatus consists of an automatic feeding-hopper adapted for the application to the coffee or grain in it of steam or dry heat, to deodorize or dry it, and a "rotary horizontal cylinder," preferably of wood, adapted by shape or inclination to automatically feed and discharge the coffee or grain, and provided with suitable inlet and discharge openings and suitable openings for the escape of the dust, &c., and longitudinal strips or ribs, and flaps for agitating and rubbing the coffee or grain, as hereinafter more particularly described.

The improvements in the apparatus consist, first, in the adaptation of the feeding-hopper for the introduction of steam or dry heat for deodorizing and drying; second, the adaptation of the apparatus for self feeding and discharging; and, third, the provision of the cylinder, with the longitudinal strips and flaps for agitating and rubbing the grain.

In the drawings, Figure 1 of the accompanying drawings represents a longitudinal elevation, partly in section, of an illustrative form of the apparatus; Fig. 2, a transverse elevation, with the cylinder and discharge-chute in transverse section on the line $z z$, Fig. 1.

Similar marks of reference indicate like parts in the two figures.

A in the drawings represents the feeding-hopper, in which the coffee or grain is deodorized and dried; B, the cleaning and polishing cylinder; C, the pipe connecting the hopper A and cylinder B; D, the discharge-chute, into which the coffee or grain is deposited by the cylinder B; E E', the trunnions on which the cylinder B revolves; F F', the frames in which the boxes or bearings of the trunnions E E' are supported G, the pulley from which the cylinder A receives its motion, by means of a belt running over or connecting the two, as indicated by dotted lines; G', the shaft of the pulley G; $g'$ $g'$, the bearings of the shaft G'; $a$, the outer solid shell, $a'$ the perforated inner shell, and $a^2$ the steam or dry-heat space, of the hopper A', and $a^3$ a pipe for conducting the steam or dry heat to the space $a^2$; F$^2$, the frame for supporting the hopper A; $b$ $b$, the wooden boards or staves of which the sides of the cylinder A are preferably composed; $b$ $b'$, the wooden boards of the same, and $b^2$ $b^2$, the end hoops; and $b^3$ $b^3$, the intermediate hoops, uniting and supporting the staves $b$ and head $b'$; H H, the longitudinal strips, and I I the flaps, of the cylinder A; J, the dust-discharges of the same; K, the grain-discharge apertures of the same; K', slides for partially or completely closing the apertures K, as required, and $k'$ brackets or guides for the support of the slides K'.

The proportions and material of the several parts and form, where it is not essential to operation, as stated, are of course variable. The precise combination and arrangement of parts shown and described may also be departed from.

The tapering form of the hopper A, and its elevation above the cylinder B, renders it self feeding or discharging.

The cylinder B is rendered self-feeding by the introduction of the pipe C from the hopper A, through one of its trunnions or journals E, made hollow for that purpose, as shown. Its flaring form and the arrangement of its inlet and discharge openings, as shown, render it self-discharging.

Either live or exhaust steam may be used in the hopper, or dry heat of any description may may be employed, as before stated, or both may be employed separately, as required, the pipe $a^3$ varying accordingly. For dry heat, the flue from a furnace burning anthracite coal may be adapted by suitable cut-offs to discharge into the space $a^2$ when required.

The drying capabilities of the hopper A may be depended on alone, or additional means employed, if desired. For instance, the interior of the cylinder B may be heated by an exhaust-steam pipe extending axially through it, entering and passing out through its trunnions or journals.

The driving-shaft G' may receive its motion in any suitable manner, and may impart it to the cylinder otherwise than as shown, if preferred.

Any desired number (one or more) of the cleats or ribs H and flaps I may be employed. The former may be of wood, and form the attachments of the latter, as shown. The flaps may be made of canvas or other flexible material.

The number, size, and position of the dust-discharges J are variable. They may be covered with perforated metal plates, as shown, or otherwise protected to prevent the escape of the grain.

The adjustability of the discharge openings K may be dispensed with. It adapts the operation of the apparatus to be regulated. This may be done by varying the speed at which the cylinder revolves, by adjustment of a valve in the pipe C, or in any other suitable manner.

The cylinder B is preferably made as nearly as possible entirely of wood, as shown, in order to prevent oxidization, and as presenting a much more natural abrading-surface; but other material may be employed and the manner of constructing it shown consequently varied.

Operation: The coffee or grain being let into the hopper A, and the discharge-apertures in the cylinder B opened, rotary motion is imparted to said cylinder through the shaft $G'$ and connections, the grain as it flows in through the pipe C being made, by the motion of the cylinder, to roll round and round in constant friction with itself, the sides of the cylinder, the strips H, and flaps I, by which means it is effectually cleaned and polished, being meanwhile constantly fed by the declination of the bottom of the cylinder to the openings K, through which it is finally deposited in the discharge-chute D, the dust, &c., separated during the operation passing out through the openings J. When it is required to deodorize or dry the coffee or grain, steam or dry heat, as required, is let into the space $a^2$ of the hopper, whence, passing through the perforations in the lining $a'$ of the same, it permeates the mass in the hopper, treating the grain to the requisite extent in its passage therethrough.

I claim as my invention—

1. The feeding-hopper A, constructed of tapering form and provided with the space $a^2$ and perforated lining $a'$, to admit of the passage of steam or dry heat to the coffee or grain in its passage therethrough to deodorize or dry it, substantially as described, in combination with the self-feeding and self-discharging cleaning and polishing cylinder B, substantially as set forth.

2. The combination, with the cylinder B, of the longitudinal strips H and flaps I, substantially as described, for the purpose set forth.

To the above specification of my apparatus for cleaning and polishing coffee, grain, &c., I have signed my hand this 13th day of September, 1869.

WM. BLAKEY.

Witnesses:
   JAS. L. ERVIN,
   FREDK. M. BLANCKE, Jr.